(12) United States Patent
Rossini et al.

(10) Patent No.: US 8,345,342 B2
(45) Date of Patent: Jan. 1, 2013

(54) MULTILAYER STRUCTURE HAVING A PHOTOCHROMIC HOST MATRIX AND MANUFACTURING METHOD

(75) Inventors: Umberto Rossini, Coublevie (FR); Anthony Saugey, Chambery (FR)

(73) Assignees: Thales, Neuilly sur Seine (FR); Essilor International (Compagnie Generale d'Optique), Charenton-le-Pont (FR)

( * ) Notice: Subject to any disclaimer, the term of this patent is extended or adjusted under 35 U.S.C. 154(b) by 137 days.

(21) Appl. No.: 13/003,425

(22) PCT Filed: Jul. 10, 2009

(86) PCT No.: PCT/EP2009/058800
§ 371 (c)(1),
(2), (4) Date: Jan. 10, 2011

(87) PCT Pub. No.: WO2010/004021
PCT Pub. Date: Jan. 14, 2010

(65) Prior Publication Data
US 2011/0116151 A1      May 19, 2011

(30) Foreign Application Priority Data
Jul. 11, 2008   (FR) ..................... 08 03981

(51) Int. Cl.
*G02F 1/03* (2006.01)
(52) U.S. Cl. .............. 359/241; 156/291; 156/295
(58) Field of Classification Search .......... 359/241, 359/273, 275, 797; 427/7, 162, 256, 299, 427/379, 384; 428/174, 323, 334, 337, 412, 428/423.1, 425.8; 430/70–78, 338, 345, 535; 351/159.62; 156/281, 295, 191
See application file for complete search history.

(56) References Cited

U.S. PATENT DOCUMENTS

| | | | | |
|---|---|---|---|---|
| 3,451,811 A | * | 6/1969 | Brynko | .................. 430/70 |
| 4,679,918 A | * | 7/1987 | Ace | ............... 351/159.62 |
| 4,793,703 A | * | 12/1988 | Fretz, Jr. | ............ 351/159.62 |
| 5,747,225 A | * | 5/1998 | Manico et al. | ............. 430/345 |
| 2005/0136260 A1 | | 6/2005 | Garcia | |
| 2011/0027594 A1 | * | 2/2011 | Johnson et al. | ......... 428/425.8 |
| 2011/0045306 A1 | * | 2/2011 | Johnson et al. | ......... 428/423.1 |

FOREIGN PATENT DOCUMENTS

| | | |
|---|---|---|
| WO | 9634735 | 11/1996 |
| WO | 0021748 | 4/2000 |
| WO | 2005019281 | 3/2005 |
| WO | 2008020829 | 2/2008 |
| WO | 2008033291 | 3/2008 |

* cited by examiner

*Primary Examiner* — Loha Ben
(74) *Attorney, Agent, or Firm* — Baker & Hostetler LLP

(57) ABSTRACT

A photochromic structure includes a plastic support of optical grade with good light transparency, having at least one face with an adhesive layer impregnated with a solution of a solvent with photochromes, having a flexible host matrix for the photochromes, which is mounted by adhesion onto another support. A structure with a uniform flexible photochromic matrix, which has rapid transition times, notably a rapid relaxation time, is thus obtained. The structure is mountable, and advantageously repositionable. It is produced via a process using roll-milling combined with a system for dispensing the solvated solution of photochromes upstream of the rolls, via which a support strip of an adhesive is entrained by the rolls, and the adhesive is gradually impregnated and then laminated on another support.

17 Claims, 3 Drawing Sheets

MULTILAYER STRUCTURE HAVING A PHOTOCHROMIC HOST MATRIX AND MANUFACTURING METHOD

CROSS-REFERENCE TO RELATED APPLICATIONS

This application is a National Stage of International patent application PCT/EP2009/058800, filed on Jul. 10, 2009, which claims priority to foreign French patent application No. FR 08 03981, filed on Jul. 11, 2008, the disclosures of which are incorporated by reference in their entirety.

FIELD OF THE INVENTION

The present invention relates to a multilayer structure with a photochromic material and to the process for manufacturing it.

BACKGROUND OF THE INVENTION

Photochromic materials are used for producing an optical function for an adaptive light filter or screen, typically an adaptive (UV) sunscreen.

Photochromism is defined as being the property of a material to react to the intensity of a given radiation, typically UV radiation, by modifying its visible-light absorption properties: the material darkens under the effect of the radiation, and lightens in the absence of this radiation. This phenomenon of lightening and darkening is reversible. Photochromic mineral and organic materials are thus found in the glass industry. According to the prior art, mineral or organic photochromic materials are obtained by incorporating photochromic substances into a material, by various known techniques. For example, photochromic organic materials are obtained, before polymerization, by mixing photochromic molecules (for example spirooxazine molecules) with a liquid monomer, or, after polymerization, by surface impregnation via a heat treatment (heat transfer). Photochromic mineral materials will be obtained, for example, by introducing silver halide crystals into the material.

The known photochromic materials have various drawbacks. The manufacturing processes used make them expensive. Notably, optical spectacle glasses incorporating such an optical property are expensive. For these reasons, it is difficult to envisage proposing cheap spectacles, of disposable type, incorporating such functionality, which might, however, be of interest to users of this type of product.

This cost also prevents their use in applications in which the surfaces concerned are relatively large, which limits their potential applications. Now, the integrated optical filter function of these materials is potentially advantageous for many products or articles such as helmet visors, for pilots, for example aircraft pilots, or protective helmets of any type for the construction, public works, sports goggles (cycling), etc. sectors, this list being by no means limiting.

Another drawback of these materials is the relatively slow transition time between the two darkened and lightened states: excitation time, for passing from the resting state to the excited state of the photochromic molecules in the presence of a given radiation, and relaxation time for passing from the excited state to the resting state, in the absence of radiation. These transition times are dependent on the solid nature of the host matrix, mineral or organic glass, which receives the photochromic molecules. Notably, the slowness of relaxation may prove to be a great inconvenience during use. Finally, as regards optical materials, the problem of replacing or repairing them, notably in the event of scratching, still arises.

SUMMARY OF THE INVENTION

In the invention, attention was thus focused on an inexpensive way of producing a multilayer structure with a photochromic material, in a form that allows a varied and adaptable use thereof.

In the invention, attention was also focused on obtaining a multilayer structure with a photochromic material in which the photochromic material has rapid transition times, notably a rapid relaxation time.

In the invention, attention was also focused on providing a multilayer structure with a photochromic material that can be readily replaced or repaired.

A solution to these technical problems was found in the invention, in a photochromic multilayer structure comprising at least one photochromic host matrix, characterized in that the said host matrix is a flexible host matrix comprising a non-crosslinked transparent adhesive, a solvent and photochromes, formed between two supports, at least one of which is a transparent plastic support.

A structure with a flexible uniform photochromic core is thus obtained, which promotes rapid transition times of the photochromes, notably rapid relaxation, due to its fluid, non-rigid nature.

The invention also relates to a manufacturing process for obtaining such a structure, based on a roll-milling step allowing, in a single process step, the impregnation to saturation of an adhesive layer formed as a strip on a support, and its bonding to another support, at least one of the supports being a transparent plastic. The process advantageously makes it possible to produce the photochromic structure in various forms suited to the required mode of use: in a peelable form, allowing repair of the final products, by replacement, and in repositionable form, in the form of a plate or as rolls, with a protective liner for subsequent use. By means of this process, all the desired objectives, in terms of improving the performance qualities of the photochromic material, of reducing the manufacturing costs and of broad possibilities of use, are achieved.

BRIEF DESCRIPTION OF THE DRAWINGS

Still other objects and advantages of the present invention will become more readily apparent those of ordinary skill in the art from the following detailed description with reference to the illustrated drawings, wherein embodiments of the invention are shown and described, simply by way of illustration of the best mode contemplated of carrying out the invention. The invention includes additional embodiments, and is capable of modifications in various aspects, without departing from the spirit or scope of the present invention. Accordingly, the drawings and detailed description thereof shall be regarded as illustrative in nature, and not as restrictive. In these drawings.

DETAILED DESCRIPTION

Figure 1:
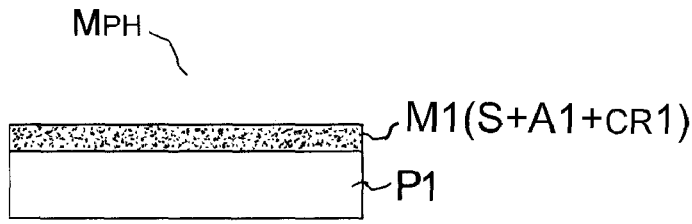
FIG. 1 is a view in cross section of a photochromic structure according to the invention ready to be mounted on another surface.

FIG. 1 illustrates a structure MPH with a photochromic host matrix according to the invention, ready to be mounted on an optical surface. This structure is formed from a transparent plastic support P1, one face of which is coated with a host matrix M1 formed from a transparent adhesive layer A1 impregnated with a solution of a solvent S and of photochromes CR1. The adhesive layer A1 simultaneously serves as a flexible host matrix for the photochromes CR1, and serves for mounting on another surface, not shown, as will be explained hereinbelow.

The term "serves for mounting on a surface" means serving for adhesion by bonding this layer to the surface.

It will be seen hereinbelow that the mounting surface may be an external optical surface, for instance a helmet visor, or the surface of another layer of the structure.

Figure 2A:
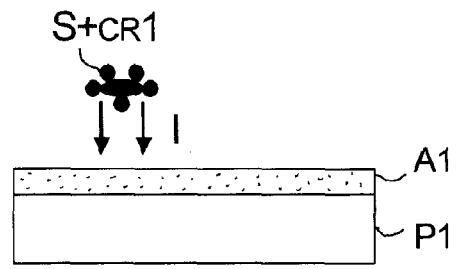
FIGS. 2a and 2b illustrate the principle for obtaining a photochromic structure according to the invention (FIG. 2a) and a simplified scheme of a corresponding manufacturing process (FIG. 2b)

As illustrated in FIG. 2a, this photochromic structure is obtained by impregnation I of an adhesive layer A1, deposited on one face of the plastic support P1, with a solution of a solvent S and of photochromes CR1. The photochromes CR1 are uniformly distributed in the adhesive layer A1 impregnated with the solvated solution, which becomes the layer or matrix M1: A1+S+CR1. They are integrated in this layer A1 in the solvent S, which gives them great mobility, allowing rapid relaxation.

The volume of solvated solution of photochromes in the adhesive layer depends on the nature of the solvent and of the adhesive, but also on the desired level of coloration. Specifically, this coloration depends on the concentration of photochromes in the host matrix. For a given level of coloration, the minimum amount of solvent in the adhesive is determined from the solvability limit of the amount of photochromes necessary to ensure this level of coloration.

It is preferably sought to obtain impregnation to saturation of the adhesive layer with the amount of solvated solution of photochromes thus determined, within limits making it possible to conserve a sufficient adhesive function. The thickness of the adhesive layer is thus preferably determined so as to obtain this impregnation to saturation, i.e. a thickness that is just sufficient to absorb the determined amount of solution to have the desired concentration, and sufficient to conserve a sufficient adhesive function. This mode of determination of the layer thickness makes it possible to ensure the desired level of coloration while at the same time conserving a structure that is not too thick. It has been possible to determine that a ratio of about 60% of solution of solvent+polychromes per 40% of adhesive allows impregnation to saturation within the limits of the desired adhesive properties. At 20% of adhesive, the adhesion function is no longer correctly ensured.

A ratio of about 60/40 is thus preferably used, to determine, for a given concentration, the smallest possible thickness of adhesive to be used for this concentration.

Figure 2B:
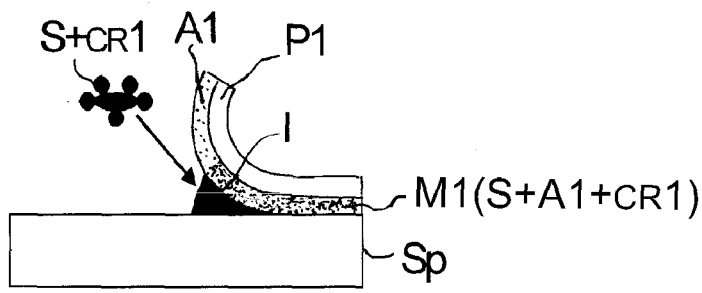

FIG. 2b diagrammatically illustrates a process in accordance with the invention, via which this structure is obtained. According to this process, one drop of the solvated solution of photochromes (solvent S plus photochromes CR1) is placed on a support Sp, and a strip 1 formed from the transparent plastic support P1 and from the adhesive layer A1 is unrolled, using a roll mill (not shown), adhesive face against the support Sp. The adhesive layer gradually becomes impregnated (I) on contact with the drop of solution. The volume of the drop is calculated to allow impregnation of the entire strip, preferably impregnation to saturation as defined hereinabove (ratio of about 60/40). In this operation, and as illustrated in the figure, the impregnated layer M1 is sandwiched between the two supports Sp and P1, such that there is no evaporation of the solvent. More generally, in the process of the invention, there is no operation of drying or evaporation of the solvent. The presence of the solvent in the host matrix participates towards the rate of reaction and the uniform distribution of the photochromes.

Moreover, according to the process of the invention, the adhesive A1 of the host matrix is not crosslinked (in other words, the manufacturing process does not include any step of crosslinking of the adhesive A1), and as such its fluidity is conserved in the material MPH, within the working temperature ranges of the final products.

The multilayer material MPH with a photochromic matrix, formed from the assembly P1 plus impregnated layer M1, may then be peeled from the manufacturing support Sp, in order to be mounted on the final optical support, for example one of the products illustrated in FIGS. 6a to 6d (spectacles, visors, etc.), with the adhesive face of layer M1 against this support. In this example, the adhesive A1 of the impregnated layer M1 serves as a host matrix for the photochromes CR1, dissolved in their solvent S, and serves for mounting onto another surface. In this operation, the impregnated layer M1 is between the two supports, the final support, for example a helmet visor (FIG. 6d), and the initial support P1 that forms the outermost face of the product. The host matrix M1 thus conserves all its imparted flexibility properties due to the fact that the adhesive A1 is not crosslinked and that the solvent S is not dried or evaporated, by virtue of which properties the photochromes contained in the impregnated matrix layer Ml remain very mobile and uniformly distributed.

According to one aspect of the invention, the peeling-off of the structural assembly M1+P1, for mounting by bonding onto a final surface, may be envisaged according to two manufacturing variants.

In one variant, the face of the support Sp on which the strip A1+P1 is unrolled is advantageously of the non-stick type (not shown), which makes it possible, after the impregnation step I, to peel off the assembly P1+M1: the material MPH of FIG. 1 is obtained, ready to be mounted on an optical surface of a final product. The adhesive A1 is, for example, an adhesive known as a PSA "pressure-sensitive adhesive", generally termed as being acrylic. More particularly, non-limiting examples that may be mentioned include PSAs of general compositions based on polyacrylates, polymethacrylates, based on ethylenic copolymers such as ethylene-vinyl acetates, ethylene-ethyl acrylates and ethylene-ethyl methacrylates, PSAs based on synthetic rubber and elastomers including silicones, polyurethanes, styrene-butadienes, polybutadienes, polyisoprenes, polypropylenes, polyisobutylenes, PSAs based on polymers comprising nitriles or acrylonitriles, PSAs based on polychloroprene, PSAs based on block copolymers comprising polystyrene, polyethylene, polypropylene, polyisoprene or polybutadiene, PSAs based on polyvinylpyrrolidone and vinylpyrrolidone copolymers, and also compositions or mixtures (of continuous or discontinuous phases) of the preceding polymers, and also block copolymers obtained from the preceding polymers.

In another variant, the adhesive A1 is of the peelable and/or repositionable type, i.e. an adhesive that has a level of adhesion corresponding to a peel force preferably of less than about 40 newtons per meter. A corresponding example is the adhesive used in stationery for making repositionable adhesive indexes.

Figure 3A:
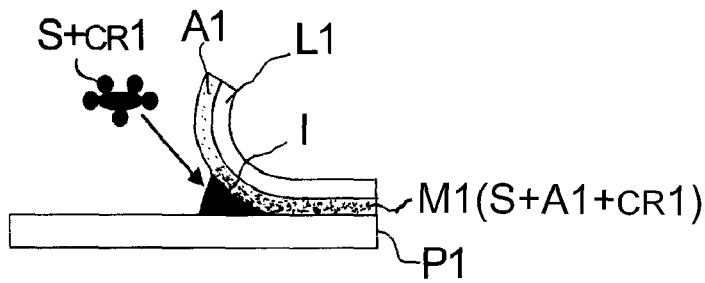
FIGS. 3a and 3b are a simplified scheme of the manufacturing process of FIG. 2b (FIG. 3a) and a view in cross section of a photochromic structure obtained via this process (FIG. 3b)
Figure 3B:
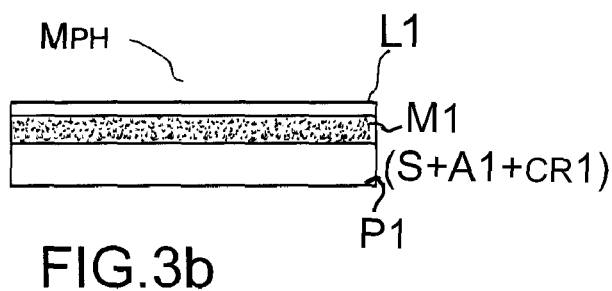

In one variant of a manufacturing process according to the invention, illustrated in FIGS. 3a and 3b, a multilayer structure with a photochromic host matrix MPH may be produced in a form that allows storage while awaiting a subsequent use. The structure is produced with a protective plastic film or backing of non-stick type L1, generally known as a "liner", on the adhesive layer A1. This protection allows subsequent mounting of the structure on an optical surface (glass, polycarbonate, etc.), by removal of the liner L1. This liner allows the host matrix M1 (=A1+S+CR1) to conserve all the fluidity properties arising from the manufacturing process (no evaporation of the solvent, no crosslinking of the adhesive). The liner is removed only at the moment when it is desired to mount the photochromic structure on the optical surface.

In a more detailed manner, and as illustrated, the photochromic structure MPH then comprises the stack of the plastic support (of optical grade) P1, the host matrix M1 comprising the adhesive A1, the solvent S and the photochromes CR1, and the liner L1. This structure may be stored and/or sold in this form, for subsequent use, in any optical device, such as spectacles, a visor, etc.

This photochromic structure with liner is produced via an impregnation process similar to that seen in FIG. 2b, with the following adaptations: the support Sp becomes the transparent plastic support P1 of the structure to be formed, and the strip 1 formed from a support and its adhesive layer A1 to be impregnated comprises the adhesive layer A1 and a liner L1 on the "outer" part (FIG. 3b).

Figure 4A:
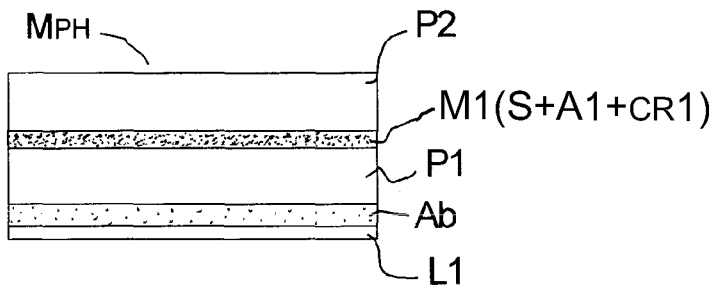
FIGS. 4a and 4b are a view in cross section of a photochromic structure according to a second variant of the invention (FIG. 4a), and a simplified scheme illustrating an example of a corresponding manufacturing process (FIG. 4b)
Figure 4B:
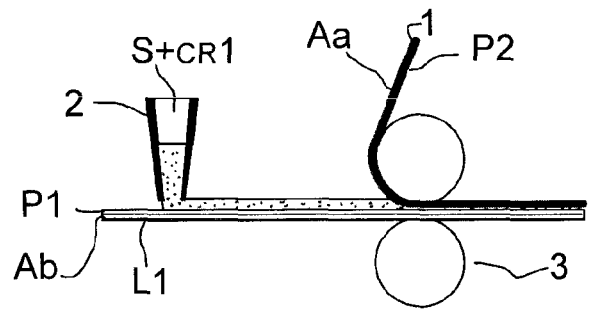

FIG. 4a illustrates another variant of a photochromic structure according to the invention, in which the flexible matrix M1 is integrated between two transparent plastic layers P1 and P2, thus forming a structure MPH with a flexible photochromic core M1=Aa+S+CR1. The manufacturing process according to the invention, for manufacturing such a structure, is illustrated in FIG. 4b. It uses a roll mill that performs in a single process step the impregnation of the adhesive Aa on the support P2 and the adhesion on the other support P1. This process is detailed later.

According to this principle, structures comprising additional layers may be manufactured. It is notably possible to provide this structure MPH with another transparent adhesive layer, which serves for mounting the structure MPH (P1/M1/P2) onto an optical transparent surface, as illustrated as an example in FIGS. 4a and 4b: the plastic support P1 comprises in this example a transparent adhesive Ab with a protective liner L1 on the face opposite that onto which the host matrix M1 (A1+S+CR1) is mounted. In this case, the process comprises the preparation of two strips: a strip with the support P2 and the adhesive layer Aa that is to be impregnated, and a strip formed from the support P1, the adhesive Ab and the liner L1. The structure obtained is thus ready to be bonded to any optical transparent surface, by removing the protective liner L1 and mounting. If the adhesive Ab is of peelable or repositionable type, the structure may be peeled off in order to be changed or repositioned.

In practice, the intensity of coloration, or hue, of the photochromic structure exposed to radiation depends on the thickness of the host matrix M1 and on the concentration of photochromes in solution in the solvent.

Since the host matrix is obtained by impregnation of the adhesive with the solvated solution of photochromes, the density of photochromes in the volume of the host matrix is equal to the density of photochromes in the volume of absorbed solvent. The higher the density, the greater may be the coloration intensity. Thus, the concentration of photochromes in the solvent will preferably be as high as possible, defined by the maximum solvation of the dye in the solvent, for a given volume of solvent. The volume of solvent is determined so as to obtain impregnation of the solvent to saturation in the adhesive layer, as defined previously. Preferably, the host matrix M1 impregnated to saturation comprises 60% of solvent plus photochromes per 40% of adhesive.

In one practical example, for a PSA adhesive layer, the dispensing system will be arranged to deliver about 10 ml per $m^2$ of solvated solution of photochromes.

It will be noted that the plastic support P1 or P2 does not absorb the solvated solution. Everything is absorbed by the adhesive layer.

The photochrome density obtained depends on the thickness of the adhesive layer. A thickness of 25 microns is typically envisaged. To increase the coloration intensity of the structure, if a maximum photochrome density in solution in the solvent is used, the thickness of the adhesive layer may be increased, for example a layer of 50 microns may be envisaged instead of 20 or 25 microns. The amount of photochromes in the photochromic material MPH is thus increased.

In this example, the structure MPH comprises a first plastic support P1 with a first host matrix layer M1 of photochromes of a first type CR1, and a second plastic support with a second host matrix layer M2 of photochromes of a second type CR2. In the example, the supports P1 and P2 are assembled via the adhesive faces of layers M1 and M2: the two host matrices M1 and M2 are superposed one on the other, sandwiched between the two supports P1 and P2, thus forming an MPH material with a flexible two-photochrome core.

In the example, the structure advantageously has an additional adhesive layer A3 for mounting on a surface, with a protective liner L1, on the outermost face of one of the plastic layers, P1 in the example. This adhesive layer A3 will advantageously be of the peelable/repositionable type.

Preferably, the photochromes CRA and CRB have complementarities in their absorption spectrum to obtain a chosen hue. For example, the photochromes of the first type CRA will have a spectrum in the visible range that corresponds to blue, and the photochromes of the second type CRB will have a spectrum in the visible range that corresponds to yellow, the superposition of the two thus giving the material a substantially neutral colour.

Figure 5A:
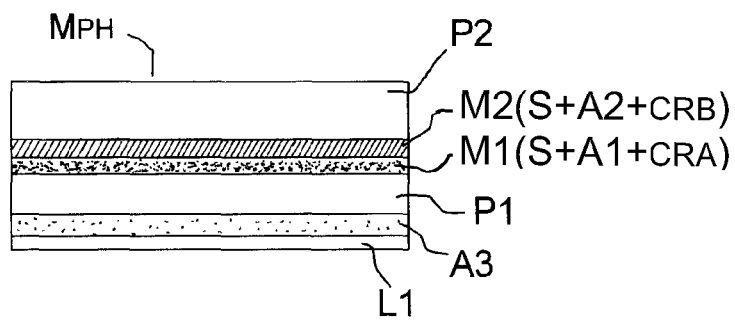
FIGS. 5a and 5b illustrate another variant of a photochromic structure according to the invention (FIG. 5a) and a corresponding manufacturing process (FIG. 5b)
Figure 5B:
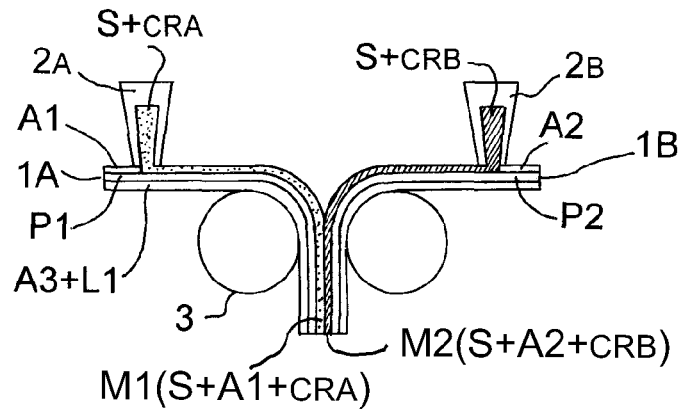
Figure 6A:
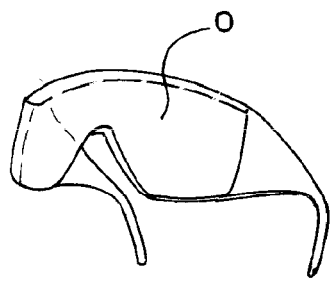
FIGS. 6a to 6d illustrate examples of optical devices with a transparent optical surface, which may be formed from or coated with a photochromic structure according to the invention.
Figure 6B:
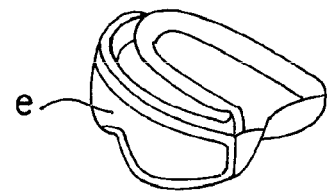
Figure 6C:
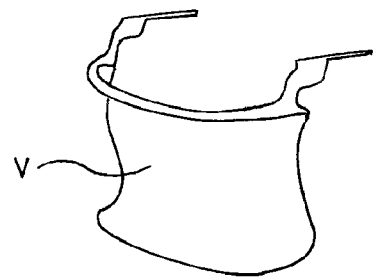
Figure 6D:
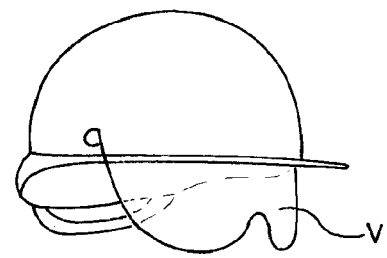

Such a two-core structure is advantageously made in the same step of a process according to the invention, by means of a roll mill as illustrated in FIG. 5b. This process is detailed later.

As a variant, it may also be made by separately preparing two supports with their adhesive layer charged with solvent and photochromes as described in relation with FIGS. 2a, 2b and 2c, and then mounted one on the other via their adhesive face, after removal of the protective liner, where appropriate (FIG. 2c). In these variants, it is possible for the host matrices not to be directly superposed one on the other.

In practice, the transparent plastic supports must have the following properties: good transparency (optical-grade plastics) and the ability to serve as support for the adhesive layer. They are advantageously thermoforming, i.e. with a transition temperature that subsequently allows hot deformation of the structure obtained, for the purpose of giving it a conformation suited to the shape of the final product. In this case, an adhesive that is inert with respect to the thermoforming temperatures will be used as host matrix adhesive.

The transparent plastic supports used must also be inexpensive. Any optical-grade plastic may thus be chosen, i.e. a plastic that combines good transparency and no image deformation during observation by transmission. This plastic will have suitable mechanical properties, notably: thermoformable and impermeable to water vapour, and with good heat stability. Among the plastics having the optical and mechanical qualities desired for use, examples that may be mentioned include polyesters, such as polyethylene terephthalate or PET, polycarbonate or polyethylene naphthalate (PEN); or cellulose triacetate (CTA); or alternatively olefinic polymers such as COCs (cyclo-olefinic copolymers). The list of plastics that may be used to make a photochromic structure according to the invention is not limiting.

As regards the adhesive layers, they must each have good transparency. In a structure according to the invention, two types thereof may be found:
 the adhesive layers A1 and/or A2 which serve both for mounting on a surface, which may be either directly the surface of a final optical device (FIGS. 1, 2a) or first the surface of another support (FIG. 2b) or of a liner (FIG. 3b), before mounting on a final optical device; or the surface of another layer of the photochromic structure (FIG. 4a or 5a); and as a host matrix for the photochromes;
 the adhesive layers such as the layers Ab (FIG. 4a) or A3 (FIG. 5a), which serve only for mounting on a surface of a final optical device and which will generally be protected by a liner L1.

The adhesive layers present on an outer face of the photochromic structure formed according to the invention, which serve for mounting onto a surface of a final optical device, may advantageously be of the peelable and/or repositionable type, such as the adhesive used, for example, in stationery for repositionable adhesive indexes. This makes it possible to reposition the material and to replace it in the event of damage: for example scratches. The photochromic material is "disposable" and replaceable: the optical device is thus repairable.

Such a peelable adhesive may also be used in the case where the photochromic structure is manufactured on a support Sp from which it is subsequently peeled, as in the case illustrated in FIG. 2b.

The solvent used will be, for example, ethyl 4-methoxyphenylacetate, known as EMPA solvent.

The photochromes will be chosen in practice for their ability to dissolve in the solvent, and as a function of their spectrum in the visible range (residual colorimetry) and of the desired absorption range. For example, photochromic compounds containing a central unit such as a spirooxazine, spiroindoline-[2,3']benzoxazine, chromene, spiroxazine, spiropyran, homoazaadamantane, spirofluorene(2H)benzopyran, naphtho[2,1-b]pyran or naphtho[1,2-b]pyran nucleus may be used.

The invention that has just been described allows the preparation of a variable light filter in the form of a cuttable, and preferably thermoformable, multilayer structure, which may be mounted onto an optical surface, and which is advantageously repositionable or disposable.

This structure is produced via the process of the invention described in relation with FIG. 4b. This process uses a roll-milling system 3 combined with a system 2A for dispensing the solvated solution of photochromes upstream of the rolls 3, via which the adhesive layer on a support as a strip is entrained by the rolls, impregnated and then laminated on another support, forming at the outlet a structure comprising a host matrix between two supports, at least one of the supports being a transparent plastic.

FIG. 5b illustrates a preferred manufacturing process for the manufacture of a photochromic bilayer structure, for instance the structure of FIG. 5a. It uses two dispensing systems 2A and 2B upstream of the roll-milling system 3, and two strips 1A and 1B, each comprising a plastic support, coated with a transparent adhesive layer. The strip 1A (or, respectively, 1B) thus comprises the support P1 (or, respectively, P2), coated with the transparent adhesive layer A1 (or, respectively, A2). The two strips are each entrained by the rolls 3, such that the adhesive layers of each strip are each impregnated with the respective solvated solution of photochromes, upstream of the rolls, by the corresponding dispensing system, and then laminated one on the other, forming at the outlet a photochromic two-core structure: two host matrices one on the other, between two supports, at least one being a transparent plastic.

In the two manufacturing examples described in FIGS. 4b and 5b, and as amply described in relation with the figures showing the various structures of the invention, one or both supports are transparent, and the supports may be of different nature or structure, monolayer or multilayer, making it possible with the same manufacturing process to manufacture different structures, adapted to the various uses or purposes of the photochromic structure.

The structure and the nature of the supports may notably vary. All the variants described previously are applicable. For example, the two supports may be monolayer: two transparent plastic supports as described in relation with FIG. 4a, or one transparent plastic support and one liner as illustrated in FIG. 3b, or alternatively one transparent plastic support and one plastic support from which the structure is then peeled, as described in relation with FIGS. 1 and 2b.

At least one of the supports may be multilayer: for example one transparent plastic support, and one support formed from a transparent plastic support, an adhesive layer and a liner as illustrated in FIGS. 4a and 5a.

Figure 7A:
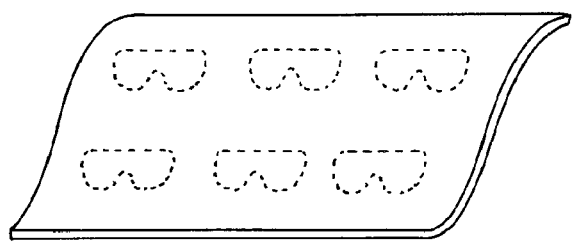
FIGS. 7a and 7b illustrate a photochromic structure according to the invention manufactured as a plate (FIG. 7a) or as a roll (FIG. 7b).
Figure 7B:

The manufacturing process according to the invention, using roll-milling techniques and commercial plastics supplied, for example, as rolls or plates, typically rolls or plates of PET or CTA plastic, makes it possible to produce a photochromic structure with or without PSA adhesive, which is efficient and rapid, inexpensively, and advantageously in this same form, i.e. as plates or rolls, as illustrated diagrammatically in FIGS. 7a and 7b.

The plate or roll material will preferably comprise on an outer face a mounting adhesive layer such as Ab (FIG. 4a) or A3 (FIG. 5a), coated with a protective sheet of liner type (L1).

Depending on the final product, the material with a flexible photochromic matrix according to the invention is cut up and thermoformed, to obtain the desired shape.

The photochromic material MPH according to the invention may be used in various ways, notably along its thickness (which is mainly given by the thickness of the plastic support (s) P1, P2):
 if it is relatively thick, which gives it a certain level of rigidity, the photochromic structure MPH may be used to prepare the optical part o of spectacles (FIG. 3a), typically of disposable spectacles, screens e of masks (FIG. 6b) or sun visors v of helmets (FIGS. 6c and 6d), for example. Given the low cost price of a photochromic structure according to the invention, at least these parts o, e or v of the product are disposable, since they are cheap;

in low thickness, for example less than about 75μ, it may be used as a mountable, or even repositionable, film coating, for example on screens or visors, or on optical glasses of spectacles. Notably, as regards projection-protecting visors or the like, generally made of polycarbonate, the material will be proposed in the form of a film-formable coating, to be bonded onto the polycarbonate.

In this case, the product is repairable: the damaged (scratched) film may be peeled off and a new film bonded on.

These few examples of application of a multilayer structure with a photochromic host matrix produced according to the invention are not limiting. Any product for which it would be potentially advantageous to integrate a function as an adaptive screen against a given radiation may use a photochromic structure according to the invention produced in an adapted form (film, or more rigid material, optionally mountable, optionally repositionable, photochromic monolayer or bilayer, etc.).

The invention claimed is:

1. A photochromic multilayer structure comprising at least one photochromic host matrix, wherein said at least one host matrix is a flexible host matrix comprising a non-crosslinked transparent adhesive, a solvent and photochromes, formed between two supports, at least one of which is a transparent plastic support.

2. The photochromic structure as claimed in claim 1, wherein the two supports are made of transparent plastic, thus forming a structure with a flexible photochromic core.

3. The photochromic structure as claimed in claim 2, further comprising, on an outer face of one of the supports, a layer of a peelable or a repositionable type transparent adhesive.

4. The photochromic structure as claimed in claim 3, further comprising, on an outer face of one of the supports, a layer of a transparent adhesive covered with a protective non-stick sheet.

5. The photochromic structure as claimed in claim 1, wherein said adhesive of the at least one host matrix is one or more of a peelable type and a repositionable type.

6. The photochromic structure as claimed in claim 5, wherein the other support of the two supports is a protective liner.

7. The photochromic structure as claimed in claim 6, wherein the structure is in roll form.

8. The photochromic structure as claimed in claim 1, wherein the other support of the two supports is a protective liner.

9. The photochromic structure as claimed in claim 8, wherein the structure is in roll form.

10. The photochromic structure as claimed in claim 1, wherein the structure is in plate form.

11. The photochromic structure as claimed in claim 1, wherein the two supports are made of transparent plastic, and the structure further comprises, between the two supports, two flexible host matrices, each comprising a non-crosslinked transparent adhesive, a solvent and photochromes, thus forming a structure with a flexible two-photochromic core.

12. The photochromic structure as claimed in claim 11, wherein the photochromes of one host matrix and the photochromes of the other host matrix are complementary in their absorption spectrum to obtain a chosen hue.

13. An optical device for protecting against a radiation, comprising a photochromic structure as claimed in claim 1.

14. A process for manufacturing a photochromic structure comprising at least one photochromic host matrix, said process using a roll-milling system combined with a system for dispensing a solution of solvent and of photochromes upstream of rolls of the roll-milling system, and a strip of a support, one face of which is coated with a layer of a non-crosslinked adhesive, wherein said process comprises a step in which said strip is entrained by the rolls, to gradually impregnate said adhesive layer with said solution of solvent and photochromes by said dispensing system, before being laminated on another support, forming at the outlet a structure with a flexible photochromic core, between two supports, at least one of which is a transparent plastic support.

15. The process as claimed in claim 14, using two dispensing systems upstream of the roll-milling system, and two strips, each comprising a support, one face of which is coated with a layer of a non-crosslinked adhesive, the two strips being entrained by the rolls of the roll-milling system, and the adhesive layer of each strip being impregnated with a respective solution of a solvent and of photochromes by a respective dispensing system, and laminated one on the other, forming at the outlet a two-core photochromic structure comprising two host matrices, one on the other, between the two supports, at least one of which is a transparent plastic support.

16. The process as claimed in claim 14, wherein at least one of the supports is multilayer, comprising a transparent plastic support layer, a layer of a peelable/repositionable adhesive and a liner.

17. The process as claimed in claim 14, wherein the amount of solvated solution of photochromes to be dispensed is determined as a function of the thickness of the adhesive layer to be impregnated, to obtain impregnation to saturation of the adhesive layer, in a ratio of approximately 60% of solvent and photochromes per approximately 40% of adhesive.

\* \* \* \* \*